(12) United States Patent
Lappalainen (10) Patent No.: US 12,195,918 B2
(45) Date of Patent: Jan. 14, 2025

(54) AUTOMATIC MONITORING OF SMELT FLOW EXITING A RECOVERY BOILER

(71) Applicant: ANDRITZ OY, Helsinki (FI)

(72) Inventor: Heikki Lappalainen, Varkaus (FI)

(73) Assignee: ANDRITZ OY, Helsinki (FI)

( * ) Notice: Subject to any disclaimer, the term of this patent is extended or adjusted under 35 U.S.C. 154(b) by 247 days.

(21) Appl. No.: 17/623,236

(22) PCT Filed: Jun. 25, 2020

(86) PCT No.: PCT/FI2020/050455
§ 371 (c)(1),
(2) Date: Dec. 27, 2021

(87) PCT Pub. No.: WO2020/260761
PCT Pub. Date: Dec. 30, 2020

(65) Prior Publication Data
US 2022/0396918 A1  Dec. 15, 2022

(30) Foreign Application Priority Data

Jun. 28, 2019 (FI) .................................. 20195579

(51) Int. Cl.
*D21C 11/12* (2006.01)
*F23G 7/04* (2006.01)
(Continued)

(52) U.S. Cl.
CPC .............. *D21C 11/122* (2013.01); *F23G 7/04* (2013.01); *F27D 21/0028* (2013.01);
(Continued)

(58) Field of Classification Search
CPC ......... D21C 11/122; D21C 11/12; F23G 7/04; F27D 21/0028; G01F 1/002; G01F 1/7086; G01F 1/86
See application file for complete search history.

(56) References Cited

U.S. PATENT DOCUMENTS 3,870,467 A   3/1975  Nelson
4,695,881 A   9/1987  Kennedy et al.
(Continued)

FOREIGN PATENT DOCUMENTS

CN   101484633 A   *  7/2009  ........... D21C 11/122
EP   0 150 910        8/1985
(Continued)

OTHER PUBLICATIONS

Tran et al, The fluidity of recovery boiler smelt, Sep. 2006, Journal of Pulp and Paper Science, vo. 32 No. 3, p. 1-6 (Year: 2006).*
(Continued)

*Primary Examiner* — Anthony Calandra
(74) *Attorney, Agent, or Firm* — Nixon & Vanderhye P.C.

(57) ABSTRACT

A system for automatic monitoring of smelt flow exiting a recovery boiler based on optical information. A processor is used to read at least one stationarily imaged video sequence, comprising digital image frames, including an area under examination representing at least part of the smelt flow exiting the recovery boiler. The processor is used to identify, in the area under examination, an area distinguishable based on colour and/or intensity information. The processor is used to determine, based on the identified distinguishable area, a monitored flow property of the smelt flow.

11 Claims, 8 Drawing Sheets

(51) Int. Cl.
- *F27D 21/00* (2006.01)
- *G01F 1/002* (2022.01)
- *G01F 1/7086* (2022.01)
- *G01F 1/86* (2006.01)

(52) U.S. Cl.
CPC ............ *G01F 1/002* (2013.01); *G01F 1/7086* (2013.01); *G01F 1/86* (2013.01)

(56) References Cited

U.S. PATENT DOCUMENTS

| | | | |
|---|---|---|---|
| 5,006,937 A | 4/1991 | Nonoshita et al. | |
| 5,542,650 A * | 8/1996 | Abel | F27D 25/001 266/271 |
| 5,616,214 A | 4/1997 | Leclerc | |
| 10,012,616 B2 | 7/2018 | Aura et al. | |
| 11,441,266 B2 * | 9/2022 | Phillips | D21C 11/12 |
| 2002/0043192 A1 | 4/2002 | Philippe et al. | |
| 2005/0134853 A1 | 6/2005 | Ingleson et al. | |
| 2009/0139468 A1 | 6/2009 | Saviharju | |
| 2018/0080173 A1 | 3/2018 | Koskinen et al. | |

FOREIGN PATENT DOCUMENTS

| | | | |
|---|---|---|---|
| EP | 0 947 625 | 10/1999 | |
| EP | 1 914 477 | 4/2008 | |
| EP | 3 431 654 | 1/2019 | |
| JP | 50-13296 | 2/1975 | |
| JP | 62-49112 | 3/1987 | |
| JP | A-S62-049112 | 3/1987 | |
| JP | H02-191785 | 7/1990 | |
| JP | 6-330489 | 11/1994 | |
| JP | H06-322685 | 11/1994 | |
| JP | 07055653 A * | 3/1995 | ............ G01M 19/00 |
| JP | 2002-202946 | 7/2002 | |
| JP | 2007-515640 | 6/2007 | |
| JP | 2008-519231 | 6/2008 | |
| WO | 02/071170 | 9/2002 | |
| WO | 2006/048495 | 5/2006 | |
| WO | 2018/147788 | 8/2018 | |
| WO | 2018/229334 | 12/2018 | |

OTHER PUBLICATIONS

Tavares et al., Effect pf the Char Bed Temperature and Temperature Distribution on Fume Generation in a Kraft Recovery Boiler, 1997, engineering and Papermakers Conference, p. 1153-1158 (Year: 1997).*
JP 0705563 A English summary, 1995 (Year: 1995).*
CN101484633 English translation, 2007 (Year: 2007).*
International Search Report for PCT/FI2020/050455 dated Oct. 7, 2020, 7 pages.
Written Opinion of the ISA for PCT/FI2020/050455 dated Oct. 7, 2020, 8 pages.
Japanese Patent Office Action for JP-A-2021-577233 (6 pages with English Translation).
Chinese Office Action cited in Application No. 202080047013.8 with Translation mailed Jun. 28, 2024, 25 pages.
International Search Report for PCT/FI2020/050324 dated Jul. 27, 2020, 4 pages.
Written Opinion of the ISA for PCT/FI2020/050324 dated Jul. 27, 2020, 8 pages.
JP Office Action with English Translation cited in Japanese Patent Application No. 2021-564130 mailed Nov. 1, 2023, 6 pages.
Empie, Jeff H. and Armstead, Daniel A.: "Smelt Sampling Probe For Use In the Kraft Recovery Boiler", Nordic Pulp and Paper Research Journal, vol. 19, No. 1, 2004, pp. 93-96.
U.S. Appl. No. 17/612,191, filed Nov. 17, 2021.
Non-final Office Action cited in U.S. Appl. No. 17/612,191, mailed Dec. 1, 2023, 17 Pages.
Amendment filed on Mar. 20, 2024 in U.S. Appl. No. 17/612,191, 11 pages.

* cited by examiner

AUTOMATIC MONITORING OF SMELT FLOW EXITING A RECOVERY BOILER

RELATED APPLICATION

This application is the U.S. national phase of International Application PCT/FI2020/050455, filed Jun. 25, 2020 which designated the U.S. and claims priority to Finnish patent application FI 20195579, filed Jun. 28, 2019, the entire contents of each of which are hereby incorporated by reference.

FIELD OF THE INVENTION

The invention relates to automatic monitoring of smelt flow exiting a recovery boiler based on optical information.

STATE OF THE ART

A recovery boiler has two primary functions: chemical recovery and the recovery of combustion heat generated in the process as steam and electrical energy. Chemical smelt flowing out of the bottom of a recovery boiler furnace through smelt spouts contains sodium sulphide, sodium carbonate and sodium sulphate.

Smelt flow exiting the recovery boiler has been monitored by, for example, training a monitoring camera on the area of a smelt spout removing smelt, and an operator has been able to use the image produced by the camera to monitor the smelt flow and changes therein. It has been possible to use this image information to, for example, detect clogging and need for cleaning. In addition, it has been possible to detect sudden smelt influxes, which cause smelt explosions in a dissolving tank, in the image produced by the camera. It has also been possible to detect smelt influxes through observation based on acoustic emission in the dissolving tank, as presented in patent U.S. Pat. No. 10,012,616 B2.

It has been possible to observe the amount of smelt flow by, for example, monitoring the concentration and quantity of green liquor exiting the dissolving tank. This quantitative data gets integrated in the long term and comprises the total quantity of smelt that has flowed through all smelt spouts.

Prior art has not made it possible to monitor the smelt flow exiting the recovery boiler quantitatively in real time. The largest recovery boilers can have more than 10 smelt spouts, and there can be differences in their flow quantities based on combustion conditions.

However, there is a clear need for detecting differences and changes in spout-specific smelt flows of the recovery boiler's combustion event, as it helps optimal chemical recovery and optimisation of power generation as well as anticipation of smelt influxes that damage the recovery boiler plant's structures and are dangerous.

SUMMARY OF THE INVENTION

According to the first characteristic of the present invention, a method is presented for automatic monitoring of a smelt flow exiting a recovery boiler. The method comprises the following steps:
  reading with a processor at least one stationarily imaged video sequence comprising digital image frames, each comprising at least one area under examination representing at least part of the smelt flow exiting the recovery boiler;
  identifying with the processor, in the at least one area under examination, at least one area distinguishable based on colour- and/or intensity information; and
  determining based on the at least one distinguishable area identified with the processor at least one monitored flow property of the smelt flow.

According to with the second characteristic of the present invention, a computer program product is presented comprising at least one computer-readable storage medium comprising a group of commands that, run by one or more processors, make a computer device carry out the method according to the first characteristic.

According to the third characteristic of the present invention, a computer device is presented, comprising: at least one processor; and at least one memory comprising computer program code, wherein the at least one memory and the computer program code have been arranged with at least one processor to make the computer device:
  read at least one stationarily imaged video sequence comprising digital image frames, each comprising at least one area under examination representing at least part of the smelt flow exiting the recovery boiler;
  identify, in the at least one area under examination, at least one area distinguishable based on colour- and/or intensity information; and
  determine, based on the identified at least one distinguishable area, at least one monitored flow property of the smelt flow.

In one embodiment of the invention, the first area under examination represents a smelt flow flowing in a smelt spout with known cross-sectional dimensions, the first distinguishable area comprises an edge of the surface of the smelt flow, and the monitored flow property comprises at least one of the following: smelt flow width, or smelt flow height in relation to the bottom of the smelt spout, the width and/or height of which are determined based on the edge of the surface of the smelt flow identified with the processor.

In one embodiment of the invention, the monitored flow property further comprises a cross-sectional surface area of the smelt flow determined with the processor based on the cross-sectional dimensions of the smelt spout and the determined width and/or height of the smelt flow.

In one embodiment of the invention, a second distinguishable area comprises an area moving in the flow direction of the smelt flow, and the monitored flow property further comprises the flow rate of the smelt flow, determined with the processor based on a change in the location of the second distinguishable area between at least two image frames of the video sequence.

In one embodiment of the invention, the monitored flow property further comprises the volume flow of the smelt flow, which is determined based on the cross-sectional surface area and flow rate of the smelt flow determined with the processor.

In one embodiment of the invention, the monitored flow property further comprises the mass flow of the smelt flow, determined with the processor based on the smelt flow density and the determined volume flow.

In one embodiment of the invention, the second area under examination represents the smelt flow flowing out of the smelt spout, to which flow a steam jet is directed to shatter the smelt flow into droplets, the third distinguishable area comprises at least some of said droplets, and the monitored flow property further comprises a droplet distribution property of said at least some of the droplets.

In one embodiment of the invention, at least two stationarily imaged video sequences imaged from different observation points of smelt flow are read with the processor, obtaining values of the monitored flow property in said different observation points, and the thus obtained values of the monitored flow property are compared using the processor.

In one embodiment of the invention, the area moving in the flow direction of the smelt flow comprises an area distinguishable due to a deviation in the shape, composition and/or temperature of the smelt flow.

In one embodiment of the invention, the width and/or height of the smelt flow are determined based on pixel-numbered dimensions of the first area under examination.

In one embodiment of the invention, the determined at least one monitored flow property of smelt flow is used to control the recovery boiler.

With a solution according to the invention, the smelt flow exiting the recovery boiler can be monitored automatically. At least some solutions according to the invention make it possible to detect differences and changes in spout-specific smelt flows of the recovery boiler's combustion event, and thereby help optimal chemical recovery and optimisation of power generation as well as anticipation of smelt influxes that damage the recovery boiler plant's structures and are dangerous.

LIST OF IMAGES

The following describes the invention with the enclosed example embodiments by referring to the enclosed drawing, where FIG. 1A schematically represents a system according to the invention;

FIG. 4B is a cross-sectional diagram of a U-shaped smelt spout according to the invention;

FIGS. 7A-7C depict some monitored flow properties of smelt flow obtained according to the invention.

The enclosed drawing uses same reference numbers throughout to refer to equivalent elements.

DETAILED DESCRIPTION OF THE INVENTION

Below is a detailed description of the embodiments of the present invention, examples of which are described in the enclosed drawing. The following detailed description, together with the enclosed drawing, is intended to describe examples and not to represent the only ways to implement the provided examples or utilise them. The following highlights example activities and series of steps/operations in order to assemble and use examples. The same or equivalent activities and steps/operations may, however, also be achieved through other examples.

Figure 1A:
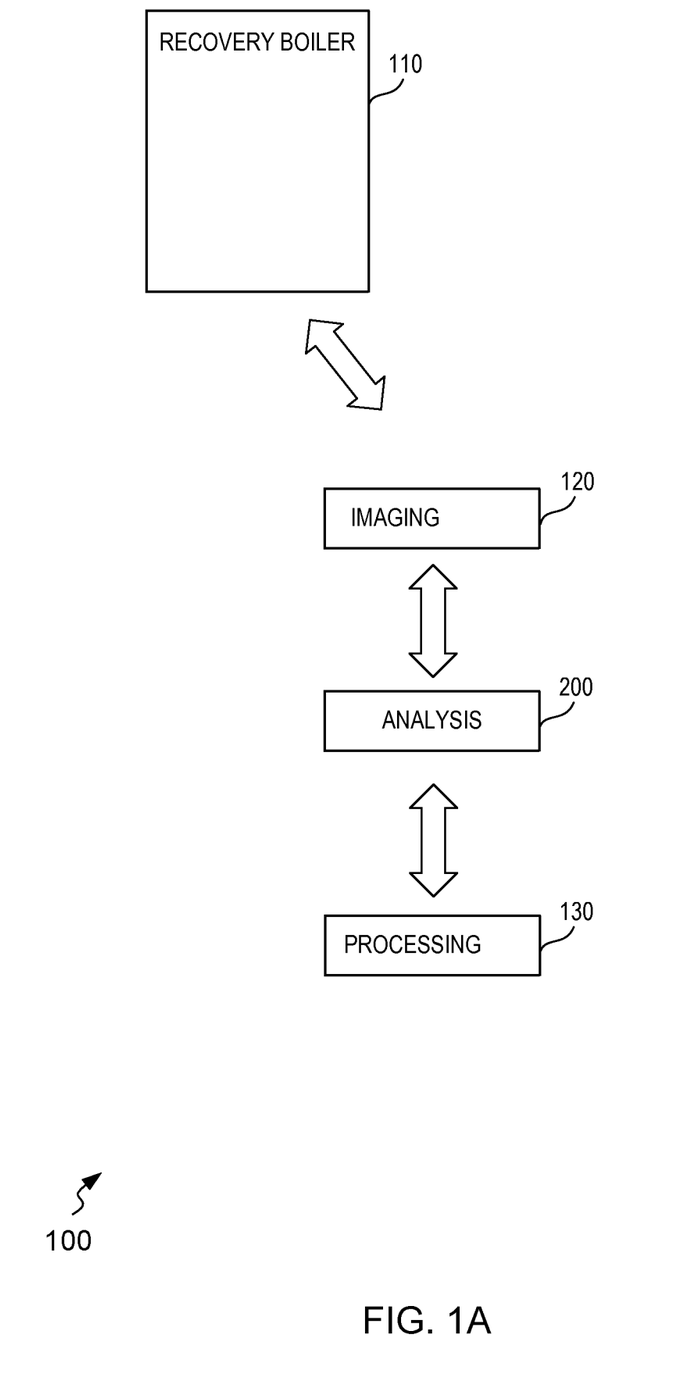

FIG. 1A depicts, as an example, the components of a system 100 according to the invention, in which system 100 different embodiments of the present invention may be implemented. The example of FIG. 1A presents a recovery boiler 110, instruments 120 for generating a video sequence comprising digital image frames of the smelt flow exiting the recovery boiler 110, a computer device 200 for automatic monitoring of the smelt flow exiting the recovery boiler 110, and instruments for further processing 130.

The recovery boiler 110 is a steam boiler designed to burn black liquor with a dual capacity to act as chemical recovery equipment and a unit suitable for producing high pressure steam and energy at a pulp mill. The recovery boiler 110 is described in more detail in connection with FIG. 1B.

The instruments 120 for generating a video sequence may comprise, for example, any suitable video camera, such as a monitoring camera, with which a human operator monitors the smelt flow from a control room. The invention does not require a separate dedicated video camera, so an existing and already installed video camera can be used. In one example, the camera is a visible region colour video camera.

Figure 6:
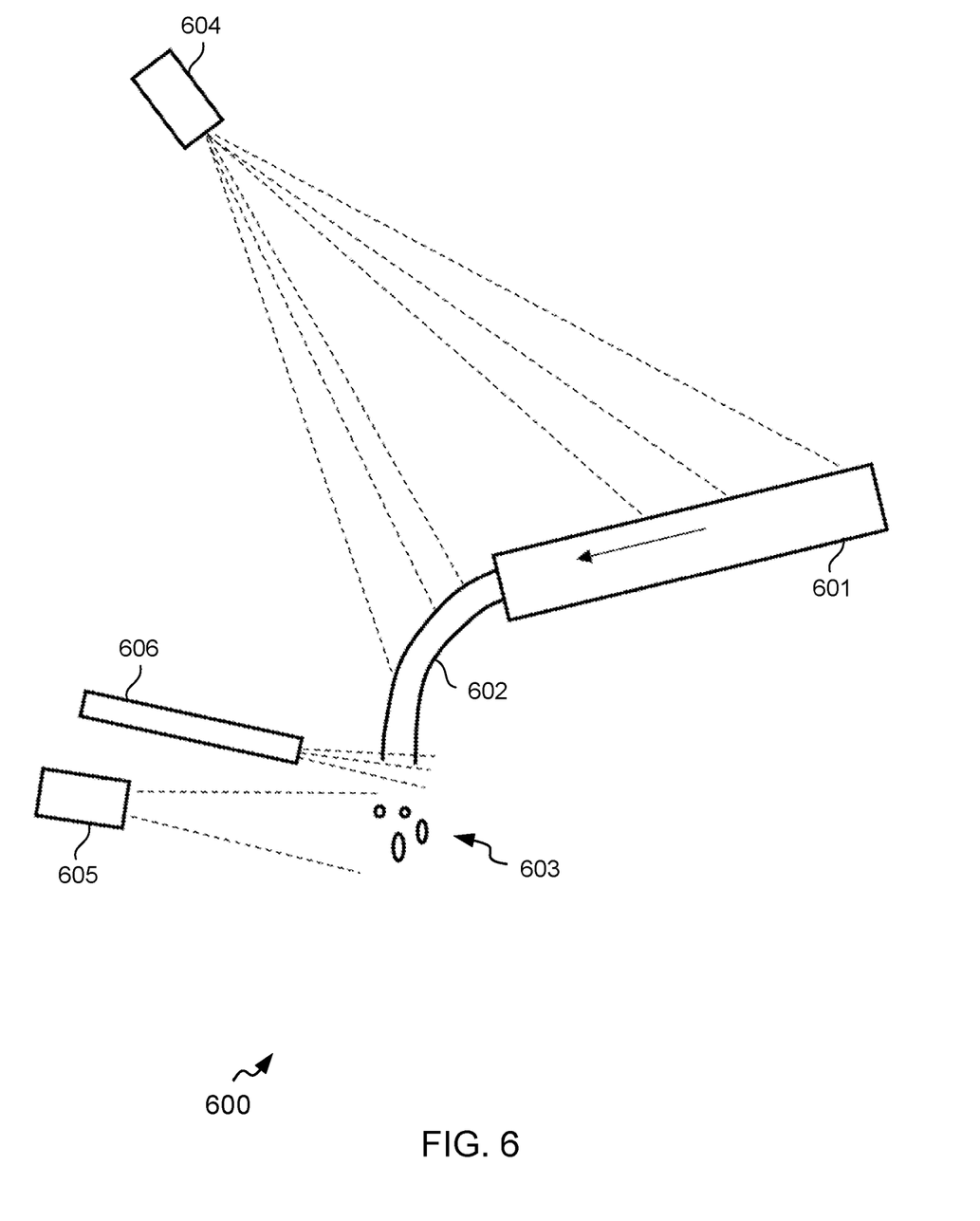
FIG. 6 schematically represents a video camera arrangement in according to the invention.

FIG. 6 schematically presents a video camera arrangement 600 according to the invention laterally. In FIG. 6, the smelt spout 601 (corresponding to, for example, smelt spout 117 of FIG. 1B), is situated sloping downwards, so that the smelt flow 602, after flowing out of the smelt spout 601, finally ends up in the dissolving tank (not shown in FIG. 6). FIG. 6 also depicts a steam nozzle 606, with which a steam jet is directed to the smelt flow 602 to shatter it into droplets 603. Further, FIG. 6 presents a first video camera 604, installed above the smelt spout 601 such that the area it images simultaneously covers the smelt flow flowing in the smelt spout 601 and the smelt flow flowing out of the smelt spout 601. As described below, the one video camera 604 can alternatively be replaced with two video cameras, one of which images the smelt flow flowing in the smelt spout 601 and the other images the smelt flow flowing out of the smelt spout 601. Further, FIG. 6 presents a second video camera 605, positioned such that the area it images covers the droplet formation 603 caused by a steam blower 606.

Figure 4A:
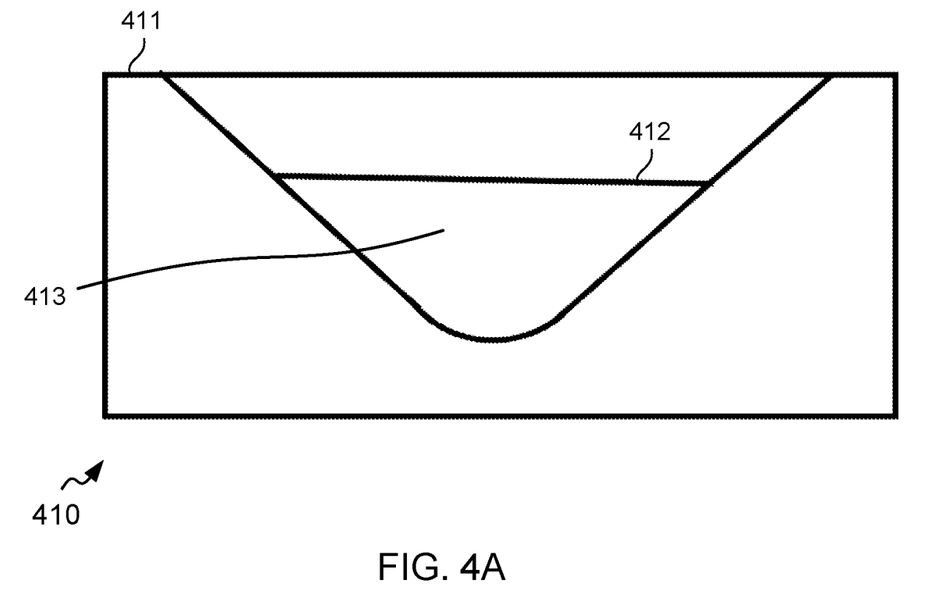
FIG. 4A is a cross-sectional diagram of a V-shaped smelt spout according to the invention.

FIG. 4A presents a cross-sectional diagram of a V-shaped smelt spout 410 (corresponding to, for example, the smelt spout 117 of FIG. 1B and/or the smelt spout 601 of FIG. 6) according to the invention. The top surface of the smelt spout is represented with line 411 in FIG. 4A, and line 412 represents the top surface of the smelt flow flowing in the smelt spout 410. Surface 413 represents the cross-sectional area of the smelt flow in the smelt spout 410, which is determined as a monitored flow property of smelt flow, as described below in connection with FIG. 2.

FIG. 4B, in turn, presents a cross-sectional diagram of a U-shaped smelt spout 420 (corresponding to, for example, the smelt spout 117 of FIG. 1B and/or the smelt spout 601 of FIG. 6) according to the invention. The top surface of the smelt spout is represented with line 421 in FIG. 4B, and line 422 represents the top surface of the smelt flow flowing in the smelt spout 420. Surface 423 represents the cross-sectional surface area of the smelt flow in smelt spout 420, which is determined as a monitored flow property of smelt flow, as described below in connection with FIG. 2.

Figure 2:
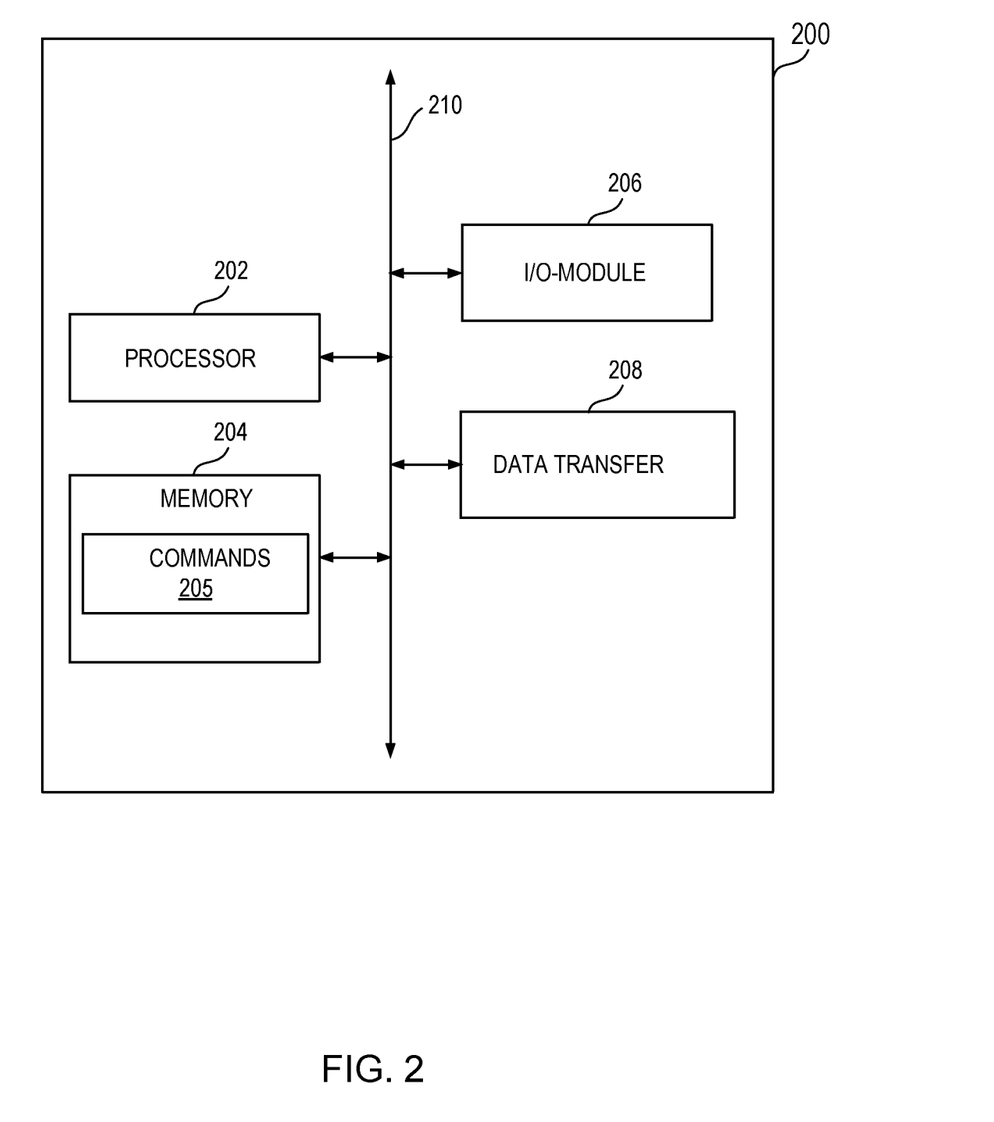
FIG. 2 schematically represents a device according to the invention.

The computer device 200 for automatic monitoring of smelt flow exiting a recovery boiler is described in more detail in the description of FIG. 2.

The instruments for further processing 140 may comprise, for example, workstation computers, server computers, databases and/or communications connections, etc., which can be used to implement or start various further processing measures. Said further processing measures may comprise, for example: giving an automatic device cleaning the smelt spout a command to clean the smelt spout, making adjustments to prevent changes in order to, for example, prevent smelt influxes and/or to adjust fuel injection and/or air injections, and/or adjust the local conditions in the recovery boiler's combustion chambers based on differences in the flow quantities flowing from different smelt spouts to achieve a laterally balanced combustion event.

Figure 1B:
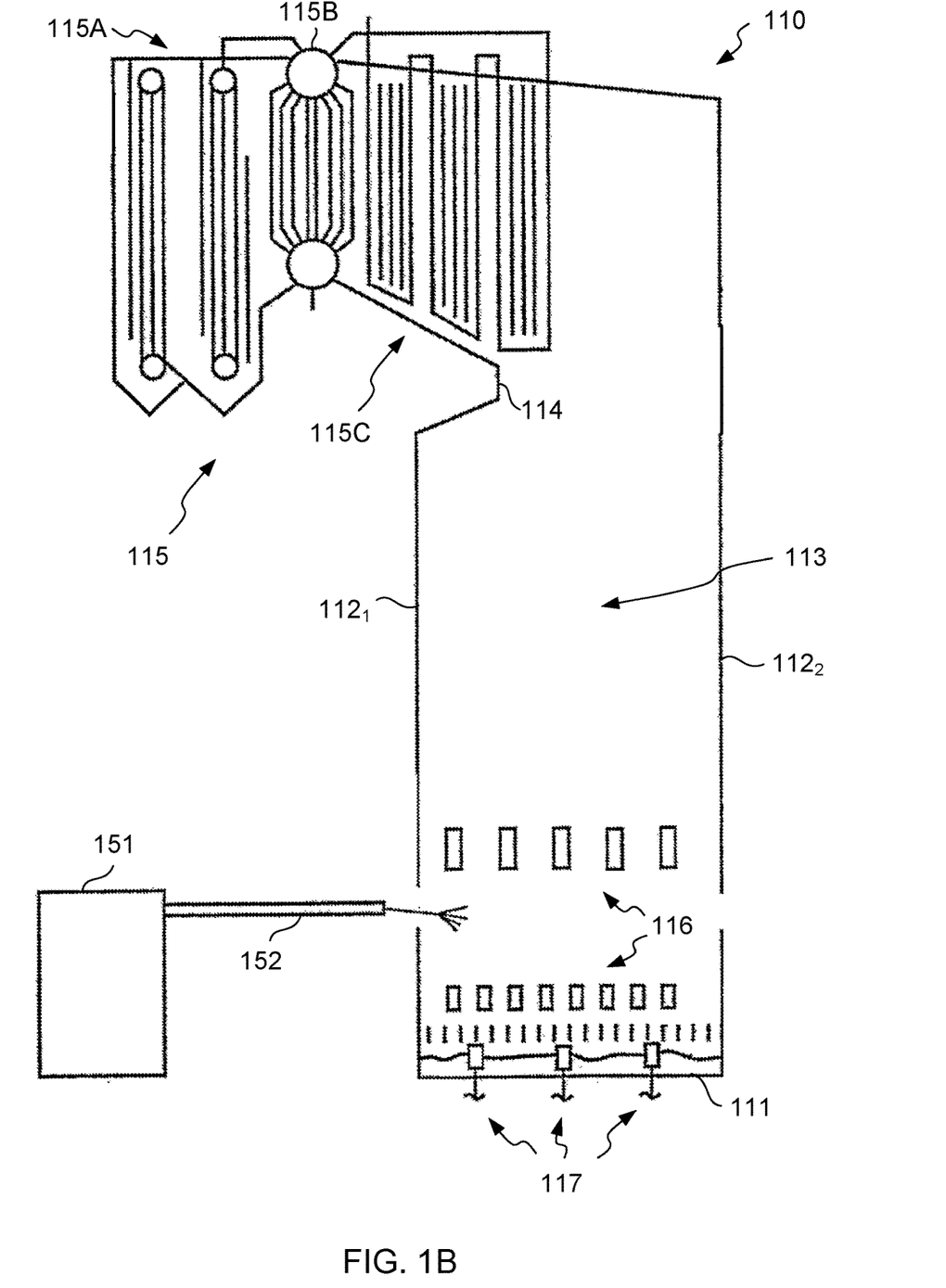
FIG. 1B schematically represents a recovery boiler according to the invention.

FIG. 1B schematically represents a recovery boiler 110 according to the invention. The recovery boiler 110 of FIG. 1B comprises, for example, a rectangular bottom 111, four walls $112_1$-$112_4$ (of which the back wall $112_1$ and front wall $112_2$ are shown in FIG. 1B), a furnace 113, a bullnose 114 and a heat transfer section 115. The bottom section of the furnace 113 has air vents 116 and smelt spouts 117. The heat transfer section 115 comprises, for example, economisers 115A, cooking piping 115B and superheaters 115C.

Further, FIG. 1B depicts an evaporator 151, used to evaporate excess water from black liquor, and liquor injector (s) 152, used to inject the black liquor to the recovery boiler 110 after evaporation. In other words, with the liquor injector 152, through the right droplet size and correction alignment, it is sought to form a mound of a preferred kind at the bottom 111 of the recovery boiler 110.

The walls $112_1$-$112_4$ of the furnace 113 of the recovery boiler 110 are typically made of vertical pipes (not shown in FIG. 1B), joined together in a gas-tight manner to form a uniform cooking piping. The water flowing inside the pipes is vaporised by the thermal energy released in the furnace 113, and finally the saturated water-steam mixture generated in the cycle is directed into a steam drum (not shown in FIG. 1B), where the steam and water are separated and the steam is directed to the superheaters 115C for superheating. When the recovery boiler 110 is in operation, its bottom 111 is entirely covered with a layer of smelt, and it is sought to form a controlled mound comprising inorganic materials and coke at the bottom of the boiler. A burning out of the organic matter of black liquor and chemical reduction in oxygen-low conditions takes place in the mound. The smelt spouts 117 are used to convey smelt off the boiler bottom 111 to the dissolving tank (not shown in FIG. 1B).

For combustion air fed into the recovery boiler 110, the recovery boiler 110 usually has three air levels: primary, secondary and tertiary with air vents 116. They all have an effect on the combustion air supply required for black liquor combustion. In deviation from FIG. 1B, the smelt spouts and air vents are typically located on the front and/or back wall $112_1$, $112_2$, because they are wider than the end walls $112_3$, $112_4$.

The superheaters 115C are usually protected by a protrusion, or bullnose 114, at the top of the recovery boiler 110, protecting the superheaters 115C from direct thermal radiation and directing the flue gas flow to the superheaters 115C. After the superheaters 115C, flue gases generated during the combustion are conveyed to the cooking piping 115B, where the heat of the flue gases is used for steam generation. Flue gases usually contain significant quantities of ash, and it is sought to separate the ash from heat transfer surfaces through regular steam sootblowing. This ash separated from flue gas channel ash hoppers and electric filter is recovered, and the recovered ash is mixed with black liquor and injected into the boiler furnace 113 for chemical recovery.

The recovery boiler 110 usually has two feedwater preheaters, or economisers 115A, situated in vertical flue gas channels. The feedwater preheaters 115A heat feedwater before it is supplied to the cooking piping 115B. The pre-heaters 115A improve the recovery boiler's 110 coefficient of performance and cool its flue gases close to the temperature of the feedwater. The economisers 115A in the flue gas flow also require regular steam sootblowing to keep them open.

FIG. 2 is a block diagram of a computer device 200 according to one embodiment.

The computer device 200 comprises at least one processor 202 and at least one memory 204 comprising computer program code 205. The computer device 200 may also comprise an input/output module 206 and/or a communication interface 208.

Although the computer device 200 in FIG. 2 is presented as comprising only one processor 202, the computer device 200 may comprise several processors. In one embodiment, commands 205 (for example, an operating system and/or different applications) may be saved in the memory 204. In addition, the processor 202 may execute saved commands. In one embodiment, the processor 202 can be implemented as a multicore processor, a single-core processor or a combination of one or more multicore processors and one or more multicore processors. The processor 202 may, for example, be implemented as one or more different processing devices, such as a coprocessor, microprocessor, controller, DSP (digital signal processor), processing circuit with or without a DSP or various other processing devices including an ASIC (application specific integrated circuit), FPGA (field programmable gate array), microcontroller unit, hardware accelerator or similar. In one embodiment, the processor 202 can be arranged to execute a hard-coded functionality. In one embodiment, the processor 202 has been implemented as an executor of software commands, where the processor 202 can be configured with commands to run algorithms and/or operations described in this description when commands are run.

The memory 204 may be implemented as one or more volatile memory devices, one or more non-volatile memory devices and/or a combination of one or more volatile memory devices or one or more non-volatile memory devices. The memory 204 can be implemented, for example, as a semiconductor memory, such as PROM (programmable ROM), EPROM (erasable PROM), flash ROM, RAM (random access memory), etc.

The input/output module 206 has been arranged to assist in the organisation of input and/or output. The input/output module 206 has been arranged to communicate with the processor 202 and the memory 204. Examples of the input/output module 206 include but are not limited to an input interface and/or output interface. Examples of the input interface include but are not limited to a keyboard, touch screen, microphone, etc. Examples of the output interface include but are not limited to a speaker, display, such as a LED display, TFT display, liquid crystal display or AMO-LED display, etc.

The communication interface 208 may enable the computer device 200 to communicate with other devices. In one embodiment, the different components of the computer device 200, such as the processor 202, memory 204, input/output module 206 and communication interface 208, have been arranged to communicate with each other through the centralised circuit 210. The centralised circuit 210 may comprise, for example, a pressed circuit board, such as a motherboard or equivalent.

The computer device 200 described and explained herein is only an example of a device that may benefit from the embodiments of the invention, and it is not intended to limit the scope of protection of the invention. Note that the computer device 200 may include a different number of components than what is presented in FIG. 2. The computer device 200 can be divided into several physical units that communicate through a suitable communication link.

Said at least one memory 204 and computer program code 205 have been arranged with at least one processor 202 to make the computer device 200 read at least one stationarily imaged video sequence comprising digital image frames, each comprising at least one area under examination representing at least a part of the smelt flow exiting the recovery boiler 110. Herein, the term 'stationarily imaged video sequence' means that the video camera used for imaging video is stationary during the imaging, so that the only movement captured in the video sequence is the movement of the target of the imaging. The video sequence may be substantially in real time.

An area under examination may comprise, for example, the area above the smelt flow flowing in the smelt spout 117, and another area under examination may comprise, for example, the area above the smelt flow after the smelt spout 117. In one example, the video camera is positioned to cover both of these area under examinations. In this case, the images taken by the camera above the smelt spout 117 may show the width of the smelt flow flowing in the smelt spout 117 and/or the width of the smelt flow after the smelt spout 117. In another example, two video cameras are used, one to image the area at the smelt flow flowing in the smelt spout 117, and the other to image the area at the smelt flow after the smelt spout 117.

Figure 5:
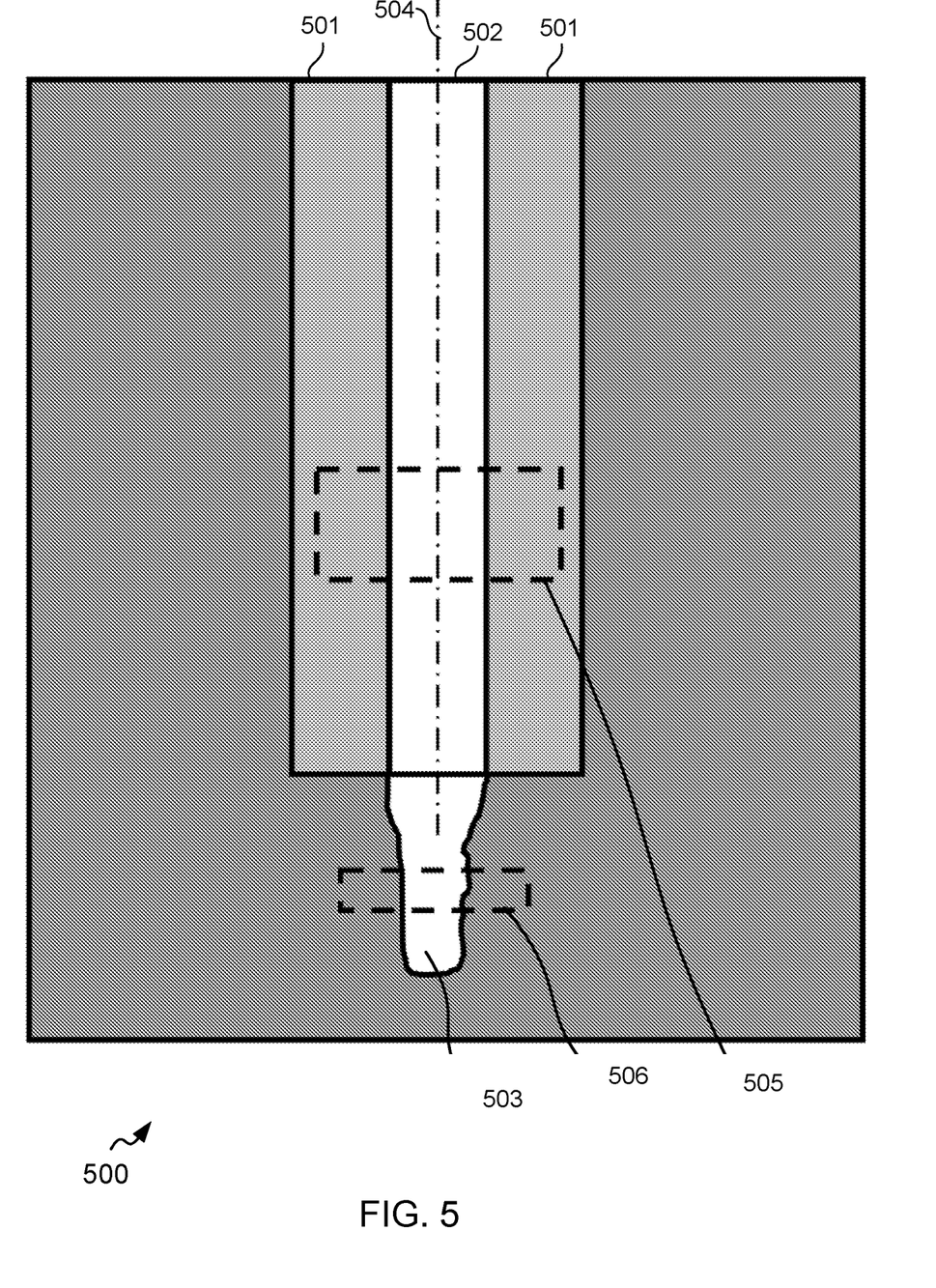
FIG. 5 schematically represents a digital image frame of a video sequence according to the invention.

FIG. 5 schematically represents a digital image frame 500 of a video sequence according to the invention. The image frame 500 covers the smelt spout 501 (corresponding to, for example, the smelt spout 117, 410, 420, and/or 601), the smelt flow 502 flowing in the smelt spout 501, and the smelt flow 503 flowing out of the smelt spout 501. The dot-and-dash line 504 represents the centre line of the smelt flow. The example of FIG. 5 presents the area under examination 505, which covers the area above the smelt flow 502 flowing in the smelt spout 501. In addition, the example of FIG. 5 presents the area under examination 506, which covers the area above the smelt flow 503 flowing out of the smelt spout 501.

Said at least one memory 204 and computer program code 205 have been further arranged with at least one processor 202 to make the computer device 200 identify, in said at least one area under examination, at least one area distinguishable based on colour- and/or intensity information.

Said at least one memory 204 and computer program code 205 have been further arranged with at least one processor 202 to make the computer device 200 determine, based on the identified at least one distinguishable area, at least one monitored flow property of smelt flow. In one example, this flow property is a quantitative variable. In one example, this flow property is a property indicating smelt flow quantity, size (such as width or droplet size) and/or change therein. In one example, the determined monitored flow property can be saved for later use, and can optionally be timestamped.

In one embodiment of the invention, the first area under examination represents a smelt flow flowing in a smelt spout 117 with known cross-sectional dimensions, the first distinguishable area comprises an edge of a surface of the smelt flow, and the monitored flow property comprises at least one of the following: smelt flow width, or smelt flow height in relation to the bottom of the smelt spout 117, the width and/or height of which are determined based on the identified edge of the surface of the smelt flow. The width and/or height of the smelt flow can be determined based on pixel-numbered dimensions of, for example, the first area under examination. In this embodiment, the monitored flow property may further comprise the cross-sectional surface area of the smelt flow, determined based on the cross-sectional dimensions of the smelt spout 117 and the determined width and/or height of the smelt flow.

In one embodiment, a second distinguishable area comprises an area moving in the flow direction of the smelt flow, and the monitored flow property further comprises the flow rate of the smelt flow, determined based on a change in the location of the second distinguishable area between two or more image frames of the video sequence. The area moving in the flow direction of the smelt flow may comprise, for example, an area distinguishable in terms of the composition and/or temperature of the smelt flow. One example of an area distinguishable due to the composition of the smelt flow is an impurity particle, which may be distinguishable from the red-toned smelt flow as, for example, an area that is darker than its surroundings or black. One example of an area distinguishable due to the temperature of the smelt flow is a hotter than normal section of the smelt flow, which may be distinguishable from the red-toned smelt flow as, for example, an area that is lighter than its surroundings. One example of an area distinguishable due to the shape of the smelt flow is a wave or rise that stands out, for example as an outline.

In one embodiment, the monitored flow property further comprises a volume flow of the smelt flow, which is determined based on the determined cross-sectional surface area and flow rate of the smelt flow. In this embodiment, the monitored flow property may further comprise a mass flow of the smelt flow, determined based on the smelt flow density and the determined volume flow.

In one example, the volume flow, or flow quantity in the smelt spout, can be calculated as follows:

$$q = v \times A,$$

where q is the quantity of flowing smelt as a unit of volume per a unit of time (e.g. litres per second), v is the velocity of flowing smelt (metres per second), and A is the cross-sectional surface area of flowing smelt (e.g. square metres).

In one example, the mass flow can be calculated as follows:

$$\dot{m} = \rho \times q,$$

where $\dot{m}$ is the mass flow, $\rho$ is the smelt density, and q is the quantity of flowing smelt as a unit of volume per a unit of time (e.g. litres per second).

In one embodiment, the second area under examination represents the smelt flow flowing out of the smelt spout 117, to which flow a steam jet, for example, is directed to shatter the smelt flow into droplets, the third distinguishable area comprises at least some of said droplets, and the monitored flow property further comprises a droplet distribution property affecting droplet distribution of said at least some of the droplets, such as droplet size (e.g. minimum and/or maximum size) and/or droplet distribution (e.g. median and/or average). The droplet distribution property can be used, for example, to adjust and optimise steam blowing and thereby conserve steam. Droplet size monitoring can be used to check, for example, that no oversized smelt lumps remain unshattered. Droplet sizes that are larger than average by one or several magnitudes may also foreshadow or indicate smelt influxes.

In one embodiment, said at least one memory 204 and computer program code 205 may be further arranged with at least one processor 202 to make a computer device 200 read at least two stationarily imaged video sequences, which are imaged in different smelt flow observation points, obtaining values of the monitored flow property in different observation points; and comparing the thus obtained values of the monitored flow property.

In one embodiment, the determined at least one monitored flow property of smelt flow is used to control the recovery boiler 110. Control measures may comprise, for example: giving an automatic device cleaning the smelt spout a command to clean the smelt spout, making adjustments to prevent changes in order to, for example, prevent smelt influxes and/or to adjust fuel injection and/or air injections, and/or adjust the local conditions in the recovery boiler's combustion chambers based on differences in the flow quantities flowing from different smelt spouts to achieve a laterally balanced combustion event.

In one embodiment, the imaged video sequence is saved before and after (for example, for 30 seconds) a disruptive event. In such case, the operator can later view (in slow motion if necessary) said video sequence, for example for analytical purposes.

When the cross-section of the smelt spout 117 is known, the smelt flow width observed in the imaged can be used to estimate the cross-sectional surface area of the smelt flow. The cross-sectional surface area of the smelt flow can be presumed to be proportional to the volume of the smelt flow per a unit of time, especially if the smelt flow temperature remains constant. Even more precise information on the flow quantity of smelt flow can be obtained when velocity information is obtained for resolvable items, such as particles or other colour- and/or intensity areas, moving with the flow in the smelt spout 117, based on location differences between images taken of said items at specific intervals. In this case, absolute flow quantity information can be obtained instead of information based on relative information that is based on width information or an assessment done through calibration.

Observation of flow width after the smelt spout 117 gives indications of the relative quantity of and changes in the smelt flow, but it does not give absolute flow quantity information. With this observation point, in case of stable flow, reference information can be obtained about whether the smelt flow width information observed from the smelt flow of the smelt spout 117 is reliable, because these pieces of width information have a strong correlation. When the ratio of these widths deviates from normal, we can conclude, for example, that the smelt spout 117 apparently requires cleaning. For this reason, the automation equipment that cleans the smelt spout 117 can here, based on such an indication, be given a command to clean the smelt spout 117.

Large (for example, over 30%) momentary deviations in smelt flow can be observed from either observation point. Other threshold values can also be used, and there may be several of them, for example, changes (going under and/or over) of 25%, 50%, 100% and/or 200%, etc., compared to the flow specified as normal, can be reported separately and used as a basis for adjustment measures to prevent such changes, for example to prevent smelt influxes and/or to adjust fuel injection and/or air injections. Flow can be determined as normal by default, for example proportional to the quantity of fuel injection or from the flow found in a maximum capacity operational situation. Usually, the recovery boiler 110 is continuously used at standard power, and the power is not changed substantially, for example according to the demand for electricity, because the primary purpose of the plant is to maintain a chemical recovery cycle.

Differences between flow quantities flowing from different smelt spouts 117 can be expressed and, based on these expressions, conditions in the combustion chamber of the recovery boiler 110 can be adjusted to achieve a balanced combustion event. Differences in flow rates and/or changes in smelt colour may indicate, for example, local temperature differences between the combustion chamber and/or the smelt at the bottom 111 of the recovery boiler 110. Combustion conditions also affect the achieved percentage of salt recovery, or reduction, which is sought to be maximised. A local weaker reduction percentage may be indicative as differences in spout-specific flows.

Smelt flow width in the spout can be observed, for example, as a very narrow line-like area under examination or as an area under examination covering a large area. If the area under examination is large (for example, representing a length of 100 mm or 200 mm in the direction of the spout), local and momentary deviations in the edge of the smelt can be filtered out of an individual image, for example by determining the average centre line and using it as width information. If this edge line significantly deviates from the longitudinal straight, it can also be considered as a flow property deviation, and a deviation indication can be created for it. It is also possible to calculate from an image the number of pixels at the smelt, which can be used to calculate the surface area of the smelt in the area under examination. When the surface area and length of the area under examination are known, they can be used to calculate the average width of the smelt flow. The area under examination may be lopsided, in which case only the area on the other side of the symmetrical smelt spout is examined, and the other side is presumed to be symmetrical. In this case, the width between the edge of the smelt and the centre line of the spout can be multiplied by two to get the width information.

The edge of the smelt flow can be indicated, for example, pixel-specifically based on a threshold value of colour or intensity, because molten salt glows bright red, very distinguishably. The colour and intensity of the smelt also depend on its temperature. The smelt spout 117 can also be lit in a line-like manner with, for example, laser lights from a different direction than the video camera, which highlights the shape profiles of the spout and smelt as angular forms of the line of light.

In one example, measurement data measured from an image frame of the video sequence are obtained from the image as a number of pixels, so the distance between the camera and the target affects the measured values. These numbers of pixels can be calibrated to correspond with physical measurement lengths, for example during commissioning. Measurement information from V-shaped smelt spouts 117 is obtained reliably with a camera placed, for example, above the centre line of the smelt spout 117 or above its extension. If the smelt spout 117 is, for example, U-shaped, the camera is preferably situated to one side of the centre line, which allows more accurate observation of changes in the height of the smelt flow in the smelt spout 117. In this case, the edge of the smelt flow can be monitored on only one side of the centre line, presuming the smelt height to be symmetrical. An image imaged from the side can give, for example, vertical width information of the smelt flow after the smelt spout 117. A second camera can also be used for this, for example in connection with a V-shaped smelt spout 117. Two or more cameras can be used with different longitudinal, vertical and lateral positionings and alignments of the smelt spout 117 at different measurement points, such as at the smelt spout 117 and at the flow after the smelt spout 117. The use of different cameras at different targets also facilitates better shielding against contamination of the cameras, as the shields can be used to limit the imaging to only the area under examinations.

It can be set as a condition for flow quantity measurement that there must be an observable flow in the area under examination after the smelt spout 117. If no flow exits the smelt spout 117, the situation can be interpreted as a blockage, or else the combustion event is temporarily not producing smelt, for example during a start-up or a stop. If the indications given by the operational situation of the recovery boiler 110 regarding fuel injection values and other combustion parameters in an appropriate time period suggest that the combustion should be producing molten salt into the smelt spout 117, an alarm, for example, can be sent to the operator and/or a fault indication to the boiler control system regarding the observed lack of flow.

Next, one example embodiment of the invention connected to determining the flow rate of the smelt flow is described in more detail. Some of the steps of this example embodiment are optional. This example embodiment uses the ARPS (Adaptive Rood Pattern Search) algorithm.

The same measurement area, or area under examination, is selected from two consecutive video image frames or two video image frames obtained with a specific time period between them. In the first video image frame, the measurement area is divided into square blocks, where block size is given as a parameter of n×n pixels. For the blocks, vertical direction is the flow direction in the spout.

For each block, a new location is sought in the latter video image frame in the same area under examination. The new location of the block is sought with a cost function, i.e. the block is fitted into the second video image frame by moving the block over the image horizontally and vertically (in a cross shape, this is where the "Rood" comes from). At each point, an error is calculated between the blocks for the cost function as a difference. The Mean Absolute Difference function, for example, can be used as the cost function. The new location of the block is determined based on the point in the image where the lowest possible cost, or the best equivalence, is obtained for the block. A similar comparison can also be done based on more than two image frames to improve the accuracy of calculation.

In the next phase, the value of the cost function is specified by seeking equivalence of the blocks to half-cardinal points. In the examination of half-cardinal points, step length and direction is determined by the found locations of the previous blocks, based on the presumption that the presumed movement of the examined block may run parallel with the blocks near it. The error is calculated as in the previous point.

The new found location of each block is the horizontal and vertical displacement produced by the minimum of the previous cost functions. Displacements are saved in vectors. One vector has horizontal movement, and another vector has vertical movement. The movements of all blocks between video image frames are compiled to the vectors.

Finally, zero velocities are removed from the vertical direction of movement, and the average is calculated. The horizontal direction of movement is not taken into account. The displacement gives the flow rate, when the time between video image frames and the pixel size in units of the International System of Units, or SI system, is known, so velocity=(average displacement in pixels)*pixel size/time between video image frames. In this example, pixel size is in the unit m (metre), and the time between video image frames is in the unit s (second).

In evaluation, blocks with no found movement can be filtered from the directions of movement, and the divergence of movements can be examined. If the divergence of a movement (displacement) is too low, a reliable displacement was not observed. However, if the divergence is extremely high, the movement is more random, and reliable velocity cannot be calculated. In these cases, a warning can be given, for example.

The measurement of flow in this example is interested in vertical movement, targeted downwards, so this direction of movement can be examined in filtration.

Figure 7A:
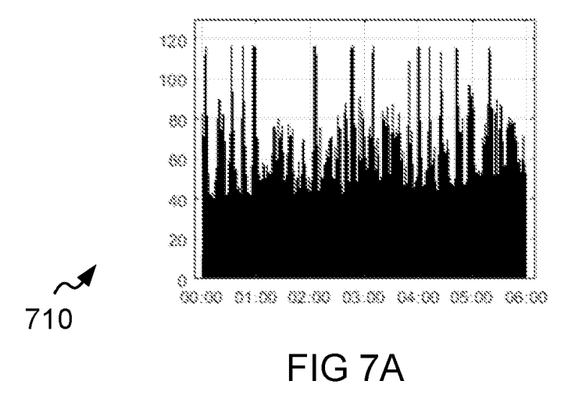
Figure 7B:
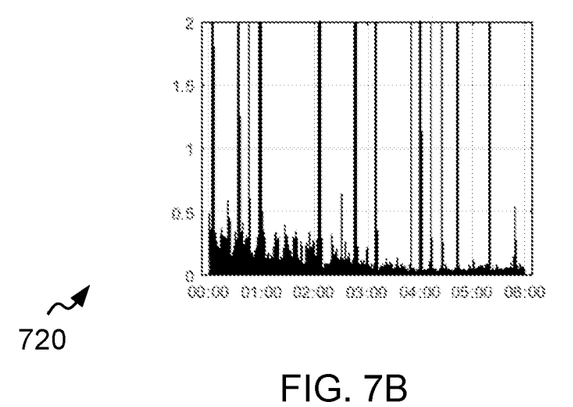

FIGS. 7A-7C depict some monitored flow properties of smelt flow obtained according to the invention. Diagram 710 represents the width of the smelt flow in the smelt spout in millimetres as a function of time (seconds). Diagram 720 represents the volume flow of the smelt flow in the smelt spout in litres per second. Diagram 730 represents the flow rate of the smelt flow in the smelt spout in metres per second. In the examples of FIGS. 7A-7C, the average flow rate is 0.53 m/s, the average volume flow is 0.88 l/s, and the average smelt flow width is 52 mm. As is evident from FIGS. 7A-7C, these monitored flow properties may vary greatly.

Figure 3:
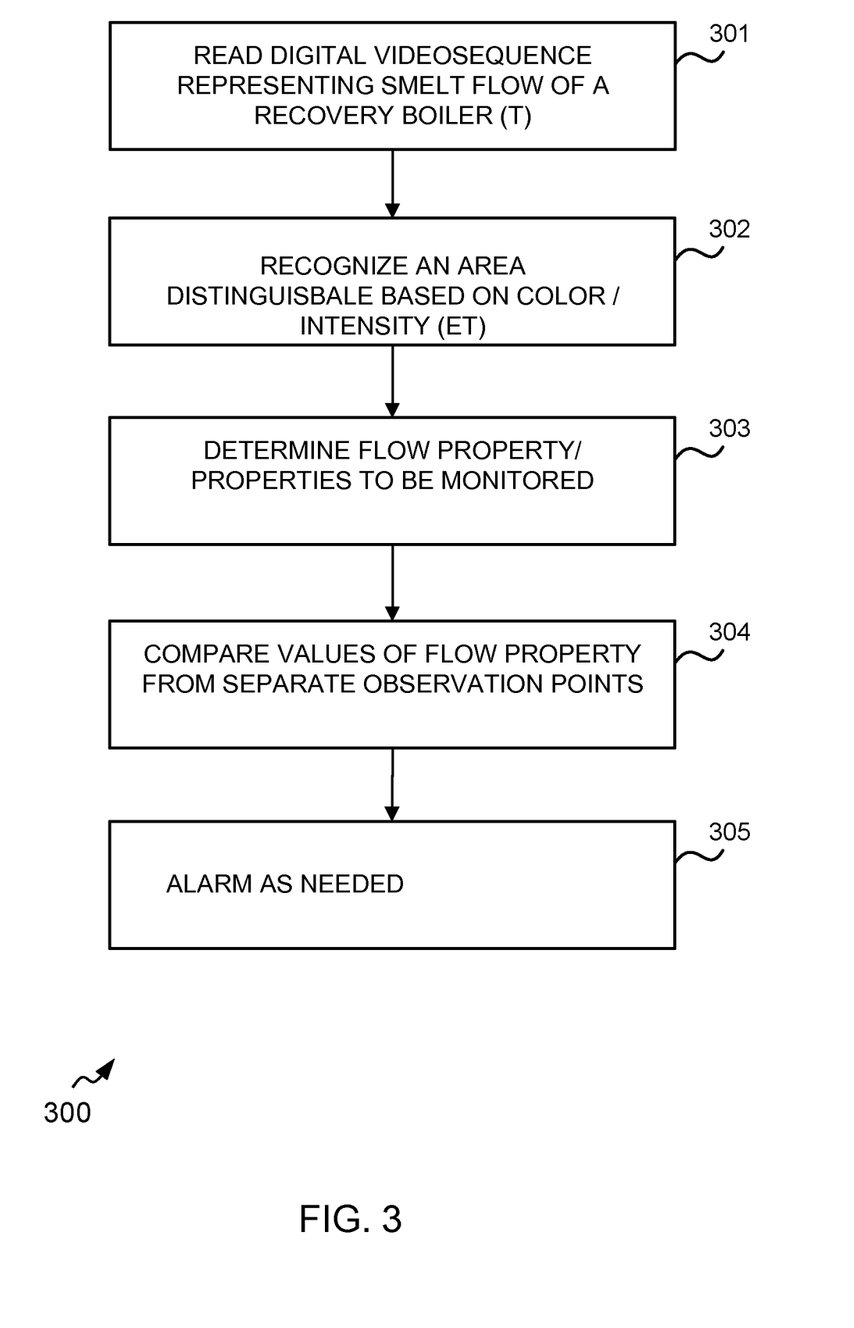
FIG. 3 schematically describes a method according to the invention.

FIG. 3 shows an example flow chart of a method 300 to determine the relative particle group section of one or more flue gases of the recovery boiler according to an example embodiment.

Operation 301 involves reading with a processor at least one stationarily imaged video sequence comprising digital image frames, each comprising at least one area under examination representing at least part of said smelt flow exiting the recovery boiler.

Operation 302 involves identifying with the processor, in said at least one area under examination, at least one area distinguishable based on colour- and/or intensity information.

Operation 303 involves determining, based on the at least one distinguishable area identified with the processor, at least one monitored flow property of the smelt flow.

In optional Operation 304, at least two stationarily imaged video sequences, imaged from different observation points of smelt flow, have been read with the processor, obtaining values of the monitored flow property in said different observation points, and the thus obtained values of the monitored flow property are compared using the processor.

In optional Operation 305, the processor is used to give an alarm (for example, to a human operator) if necessary. An alarm may be given, for example, when the result of the comparison of Operation 304 exceeds some threshold value specified in advance.

The method 300 can be performed with the device 200 of FIG. 2. The additional characteristics of the method 300 are direct results of the operations and parameters of the device 200, so they are not repeated here. The method 300 can be performed with one or more computer programs.

Example embodiments may include, for example, any suitable computer devices and equivalent that are capable of running processes of the example embodiments. The devices and subsystems of example embodiments can communicate with each other using any suitable protocol, and they can be implemented using one or more programmed computer systems or devices.

One or more connection mechanisms, including an Internet connection, telecommunication in any suitable format (voice, modem, etc.), wireless communication media and equivalent, can be used with the example embodiments. The communication networks or connections may include, for example, one or more satellite communication networks, wireless communication networks, cellular communication networks, 3G communication networks, 4G communication networks, 5G communication networks, a general switched telephone network, package data networks, the Internet, intranets or combinations of these.

Let it be understood that the example embodiments are only examples, because many variations of the specific equipment used to implement the example embodiments are possible, as persons skilled in the art understand. For example, the functionality of one or more components of the example embodiments can be implemented through hardware and/or software.

The example embodiments can save information related to the different processes described in this description. This information can be saved in one or more memories, such as a hard disk, optical disk, magnetic-optical disk, RAM memory, etc. Information used to implement the example embodiments of the present invention can be saved in one or more databases. Databases can be organised using data structures (for example, data records, tables, boards, fields, graphs, trees or lists) included in one or more memories or storage media listed here. As regards example embodiments, the described processes may include appropriate data structures for saving the data collected and/or generated by processes of devices and subsystems of the example embodiments into one or more databases.

The example embodiments may be implemented in whole or in part using one or more general-purpose processors, microprocessors, DSP processors, microcontrollers, etc., programmed according to the teachings of the example embodiments of the present invention, as persons skilled in the art understand. An average programmer can easily produce appropriate software based on the teachings of the example embodiments, as persons skilled in the art of software understand. In addition, the example embodiments can be implemented using application-specific integrated circuits or combining conventional component circuits of the appropriate network, as persons skilled in the art of electronics understand. Therefore, the example embodiments are not limited to any specific combination of hardware and/or software.

Saved in any computer-readable media or a combination thereof, the example embodiments of the present invention may comprise software for controlling the components of the example embodiments, running components of the example embodiments, enabling interaction between components of the example embodiments and human users, etc. Such software may include but is not limited to device drivers, firmware, operating systems, software development tools, application software, etc. These computer-readable media may include the computer program product of the embodiment of the present invention for executing processes in the implementation of the invention in whole or in part (if processing is distributed). The computer code devices of the example embodiments of the present invention may include any suitable interpretable or executable code mechanisms, including but not limited to command scripts, interpretable programs, dynamic link libraries, Java classes and applets, entirely executable programs, etc. In addition, parts of the processing of the example embodiments of the present invention may be distributed in order to improve performance, reliability, costs, etc.

As stated above, components of the example embodiments may include a computer-readable medium or memory to store commands programmed according to the teachings of the present invention as well as data structures, tables, data records and/or other data described in this description. The computer-readable medium may comprise any suitable medium that participates in organising commands to be performed by the processor. Such medium may have several forms, including but not limited to a non-volatile or permanent storage medium, volatile or non-permanent storage medium, etc. Non-volatile storage media may comprise optical or magnetic disks, etc. Volatile storage media may comprise dynamic memories, etc. General forms of computer-readable media may include a floppy disk, hard drive or any other medium that can be read by a computer.

The invention is not limited to concern only the example embodiments described above; many variations are possible within the framework of the inventive idea specified by the patent claims.

The invention claimed is:

1. A method for automatic monitoring of a smelt flow exiting a recovery boiler, the method comprising:
reading, with a processor, at least one stationarily imaged video sequence of digital image frames, each of the digital image frames includes at least one area under examination representing at least part of the smelt flow exiting the recovery boiler;
identifying, with the processor, in the at least one area under examination, at least one area distinguishable based on color and/or intensity in the digital image frames; and
determining, based on the at least one distinguishable area identified with the processor, at least one monitored flow property of the smelt flow,
wherein the at least one distinguishable area includes a first distinguishable area under examination,
wherein the first distinguishable area under examination represents the smelt flow flowing in a smelt spout with known cross-sectional dimensions, the first distinguishable area comprises an edge of a surface of the smelt flow, and
wherein the monitored flow property comprises at least one of: smelt flow width and smelt flow height, wherein the smelt flow height is relative to a bottom of the smelt spout, and the smelt flow width and/or the smelt flow height are determined with the processor based on the edge of the surface of the smelt flow in the first distinguishable area.

2. The method according to claim 1, wherein the monitored flow property further comprises a cross-sectional surface area of the smelt flow determined with the processor based on the known cross-sectional dimensions of the smelt spout and the smelt flow width and/or the smelt flow height.

3. The method according to claim 1, wherein the width and/or the height of the smelt flow are determined based on pixel-numbered dimensions of the first area under examination.

4. The method according to claim 1, further comprising:
controlling the recovery boiler using the at least one monitored flow property of the smelt flow.

5. A method for automatic monitoring of a smelt flow exiting a recovery boiler, the method performed with at least one processor wherein the method includes:
capturing stationary imaged video sequence of digital image frames generated by at least one camera positioned to image the smelt flow moving through a smelt spout attached to the recovery boiler and/or from the smelt spout;
reading the stationarily imaged video sequence of digital image frames, each of the digital image frames represents at least part of the smelt flow flowing through the smelt spout or flowing from the smelt spout;

identifying, in the digital image frames, a first area of the images of the smelt flow that is distinguishable from other areas in the digital image frames based on color and/or intensity in the digital image frames;

wherein the first area comprises an area of the smelt flow moving in a flow direction of the smelt flow, and determining a monitored flow property of the smelt flow based on a change in a location of the first area between at least two of the digital image frames of the stationarily imaged video sequence.

6. The method according to claim 5, wherein the monitored flow property further comprises a volume flow of the smelt flow, which is determined based on a cross-sectional surface area of the smelt flow and the flow rate of the smelt flow.

7. The method according to claim 6, wherein the monitored flow property further comprises a mass flow of the smelt flow, determined with the processor, based on a density of the smelt flow and the volume flow.

8. The method according to claim 5, wherein the second area under examination represents the smelt flow flowing out of the smelt spout, and the method further comprises directing a steam jet against the smelt flow to shatter the smelt flow into droplets, wherein the at least one distinguishable area includes a third distinguishable area under examination that comprises at least some of said droplets, and wherein the monitored flow property further comprises a droplet distribution property of said at least some of the droplets.

9. The method according to claim 5, wherein the camera is a first camera and the method includes a second camera;

wherein the first camera is at a first position relative to the smelt spout and positioned to capture a first video sequence of the at least one stationarily imaged video sequence and the second camera is at a second position relative to the smelt spout, different from the first position and is positioned to capture a second video sequence of the at least one stationary imaged video sequence, and the method further comprises:
  determining, using the processor, a first value of the first video sequence;
  determining, using the processor, a second value of the second video sequence; and
  comparing, using the processor, the first value and the second value.

10. The method of claim 5, wherein the area of the smelt flow moving in the flow direction comprises an area distinguishable due to a deviation in a shape, composition and/or temperature of the smelt flow.

11. The method according to claim 5, further comprising:
  controlling the recovery boiler using the at least one monitored flow property of the smelt flow.

* * * * *